United States Patent
Song

(10) Patent No.: US 7,564,186 B2
(45) Date of Patent: Jul. 21, 2009

(54) REFLECTIVE DISPLAY DEVICE WITH DIVIDED ELECTRODES

(75) Inventor: Moon-Bong Song, Seoul (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 11/565,795

(22) Filed: Dec. 1, 2006

(65) Prior Publication Data

US 2007/0139759 A1    Jun. 21, 2007

(30) Foreign Application Priority Data

Dec. 2, 2005   (KR) .................. 10-2005-0116928

(51) Int. Cl.
*H01J 17/49* (2006.01)
(52) U.S. Cl. ....................... 313/582; 313/584
(58) Field of Classification Search ............. 313/581, 313/582, 584, 585
See application file for complete search history.

(56) References Cited

U.S. PATENT DOCUMENTS

2006/0226779 A1 * 10/2006 Ahn .................. 313/583

* cited by examiner

*Primary Examiner*—Vip Patel
(74) *Attorney, Agent, or Firm*—Fish & Richardson P.C.

(57) ABSTRACT

Disclosed herein is a reflective display device. The reflective display device includes a first substrate and a second substrate, a first electrode group and a second electrode group, and electrically charged particles. The first substrate and the second substrate are located parallel to each other and configured to form a plurality of sub-pixel cavities. The first electrode group and the second electrode group are respectively formed on the first and second substrates, arranged to cross each other with the sub-pixel cavities interposed therebetween, and configured such that each electrode of one of the first and second electrode groups is divided into two or more line electrode patterns and the line electrode patterns extend through the corresponding sub-pixel cavities. The electrically charged particles are located in the corresponding sub-pixel cavities, and configured to move in response to variation in the polarity of voltage applied across the first and second electrodes.

11 Claims, 5 Drawing Sheets

REFLECTIVE DISPLAY DEVICE WITH DIVIDED ELECTRODES

BACKGROUND OF THE INVENTION

1. Field of the Invention

The present invention relates generally to a reflective display device, such as electronic paper, and, more particularly, to a reflective display device having divided electrodes, which reduces the asymmetry of drive voltages by modifying the shape of scan electrode pattern.

2. Description of the Related Art

Electronic paper, which is a kind of reflective display device, is a new display device having the advantages of an existing display device as well as printed paper, and is one of representative next generation display devices currently being developed, along with a Liquid Crystal Display (LCD), a Plasma Display Panel (PDP) and an organic ElectroLuminescent (EL) device.

Such electronic paper is classified as Gyricon-type electronic paper using twist balls, electrophoresis-type electronic paper using electrophoresis and microcapsules, cholesterol liquid crystal-type electronic paper using cholesterol liquid crystals, and collision electrification-type electronic paper using such as toner particles.

Among the various types of electronic paper, the collision electrification-type electronic paper is a display device having a thickness of about 0.1 mm, in which white and black particles fill a gap between transparent films, and which uses the phenomenon in which, due to collisions that occur when toner particles are coated with silica to which an electrification promoter is added and an electric field is applied thereto, the toner particles are charged, the polarity of the charge is determined by the electrification promoter.

FIG. 1 is a sectional view showing the internal structure of the principal portion of a typical collision electrification-type electronic paper display device, and FIG. 2 is a plan view showing the electrode arrangement structure of the typical collision electrification-type electronic paper display device.

The typical collision electrification-type electronic paper display device is described with reference to FIGS. 1 to 3 below. Referring to FIG. 1, two types of particles 32 and 34, having different colors, are distributed in each of a plurality of cells, which are formed by dividing a space between two substrates 10 and 20 using the barrier ribs 30. In this case, when a voltage is applied across the electrodes 12 and 22, which are respectively patterned on the two substrates 10 and 20, positively charged particles move to a (−) electrode, and negatively charged particles move to a (+) electrode.

In the above-described electronic paper display device, each of the pixels is generally formed in a square shape. Particularly, in the case of a color display device, a single pixel is divided into three sub-pixels so as to implement Red (R), Green (G) and Blue (B) colors.

Referring to FIG. 2, a single scan electrode 12 extends through a single pixel cavity, and three data electrodes 22, which cross the single scan electrode 12, extend corresponding to respective sub-pixels. Accordingly, the single scan electrode 12 is formed to have a width three times as great as that of each of the three data electrodes 22.

The above-described different electrode width between the scan electrode 12 and the data electrodes 22 makes electric field distribution non-uniform between the two substrates 10 and 20, and therefore, as shown in FIG. 3, the data electrodes 22 having a relatively small width causes denser electric field distribution than the scan electrode 12.

For reference, although FIG. 3 shows a view obtained by rotating one of the two electrode groups by 90 degrees in a direction parallel to a corresponding substrate to facilitate the comparison of the widths of the two electrode groups, the two electrode groups are actually disposed to cross each other.

As described above, the data electrodes 22 are implemented to have a width smaller than that of the scan electrode 12 and, thus, a dense electric field distribution is exhibited, so that, when the display device is driven, a drive voltage for changing a black color into a white color and another driving voltage for changing a white color into a black color differ from each other, in which asymmetry of the drive voltages results.

Therefore, problems occur in that, when drive waveforms are designed and drive Integrated Circuits (ICs) are manufactured, a voltage supply source and a drive circuit are additionally required due to the asymmetry, therefore the above-described asymmetry of the drive voltages causes a number of difficulties related to conducting drive control as well to the design of circuitry.

SUMMARY OF THE INVENTION

Accordingly, the present invention has been made keeping in mind the above problems occurring in the prior art, and an object of the present invention is to provide a reflective display device, which realizes the symmetry of drive voltages by causing scan electrodes and data electrodes to have the same width, thus facilitating the design of drive waveforms, and which allows identical types of drive ICs to be used for the two electrode groups, thus facilitating the mass production of display devices.

In order to accomplish the above object, the present invention provides a reflective display device, including a first substrate and a second substrate located parallel to each other and configured to form a plurality of sub-pixel cavities; a first electrode group and a second electrode group respectively formed on the first and second substrates, arranged to cross each other with the sub-pixel cavities interposed therebetween, and configured such that each electrode of one of the first and second electrode groups is divided into two or more line electrode patterns and the line electrode patterns extend through the corresponding sub-pixel cavities; and electrically charged particles located in the corresponding sub-pixel cavities, and configured to move in response to variation in the polarity of voltage applied across the first and second electrodes.

It is more preferred that the line electrode patterns, which are obtained through the division of each electrode of the one electrode group, be formed to have a width substantially identical to that of each electrode of a remaining electrode group.

Furthermore, it is preferred that each electrode of the one electrode group, which is divided into the two or more line electrode patterns, is divided into three line electrode patterns.

Furthermore, when the electrodes of the first electrode group are data electrodes and the electrodes of the second electrode group are scan electrodes, each of the scan electrodes may be divided into two or more line electrode patterns so that a width of the line electrode patterns is identical to that of the data electrodes.

In addition, the present invention provides a reflective display device, including a first substrate and a second substrate located parallel to each other and configured to form a plurality of sub-pixel cavities; a plurality of data electrodes formed on the first substrate and configured to extend through the corresponding sub-pixel cavities; a plurality of scan electrodes disposed on the second substrate to cross the data electrodes with the sub-pixel cavities interposed between the data electrode and the scan electrodes, each of the scan electrodes being formed to have two or more line electrode patterns, which are obtained through division, wherein the line electrode patterns extend through the corresponding sub-pixel cavities; and electrically charged particles located in the corresponding sub-pixel cavities, and configured to move in response to variation in the polarity of voltage applied across the first and second electrodes.

It is more preferred that each of the scan electrodes be divided into two or more line electrode patterns so that the line electrode patterns diverge from a single electrode connection portion and extend through the corresponding sub-pixel cavities.

Furthermore, the line electrode patterns, which are obtained through division of each of the scan electrodes, are formed to have a width substantially identical to that of the data electrodes.

Furthermore, it is more preferred that each of the scan electrodes be divided into three line electrode patterns.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 4:
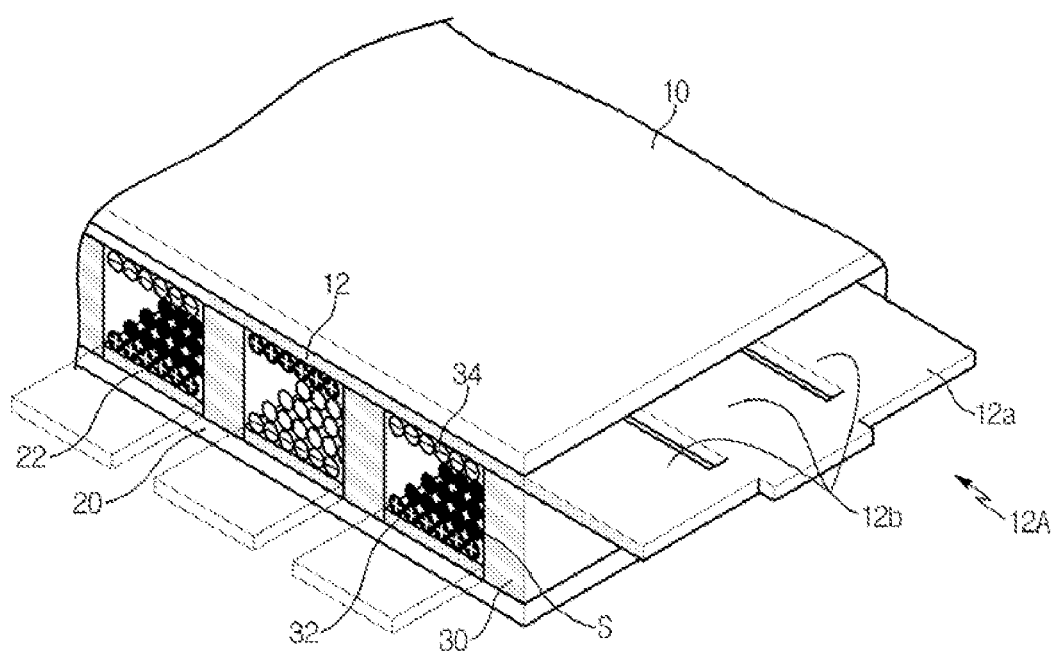
FIG. 4 is a perspective view showing the electrode arrangement structure of the principal portion of a reflective display device according to an embodiment of the present invention.
Figure 5:
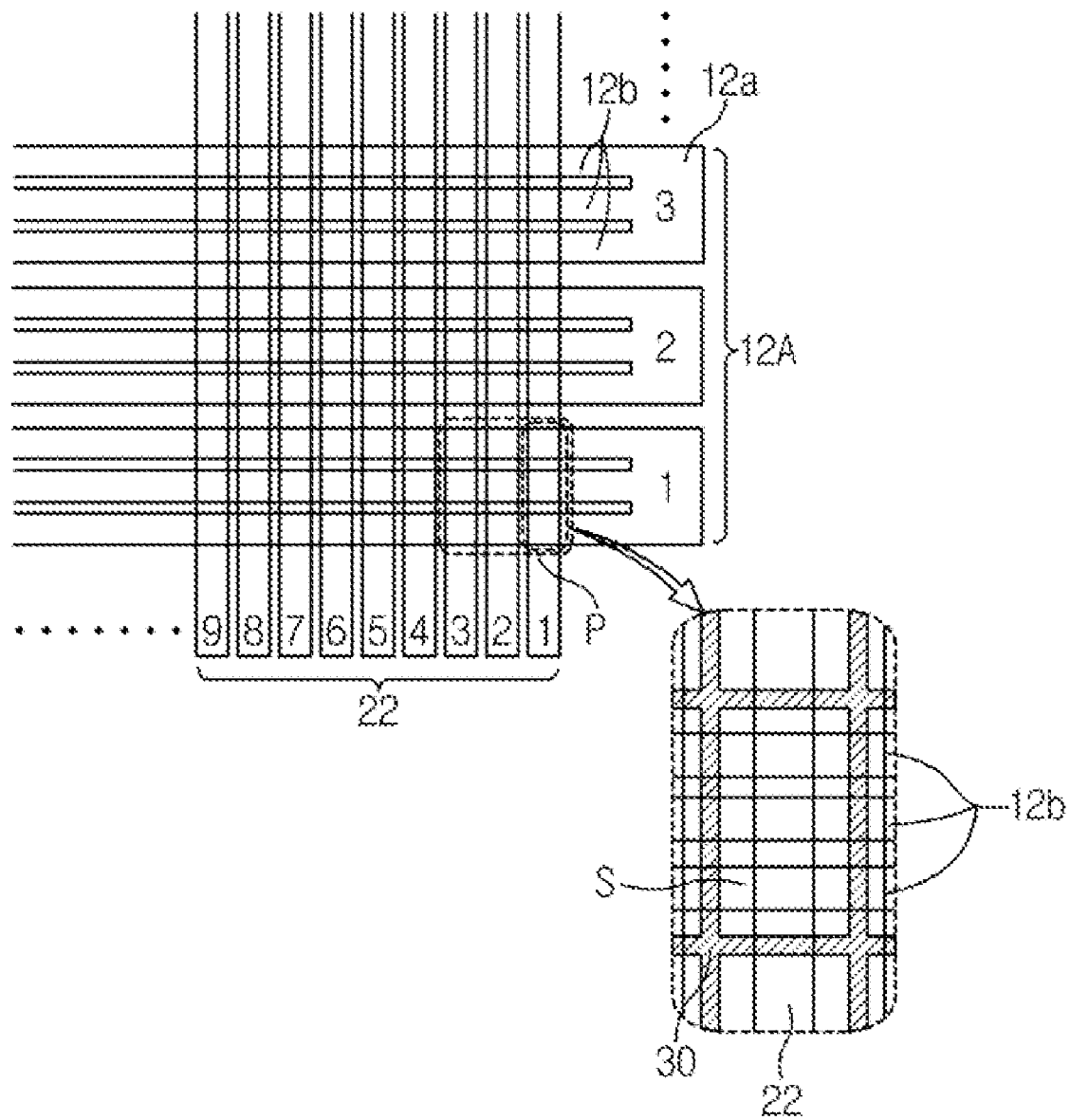
FIG. 5 is a plan view showing the electrode arrangement structure of the reflective display device according to the embodiment of the present invention.

FIGS. 4 and 5 are views showing the electrode arrangement structure of a reflective display device according to an embodiment of the present invention. FIG. 4 is a cut-away perspective view of the principal portion of the reflective display device, and FIG. 5 is a plan view showing the electrode arrangement structure of the principal portion of the reflective display device.

As shown in FIG. 4, a single pixel P is divided into three sub-pixels S by barrier ribs 30 between an upper substrate 10 and a lower substrate 20, and two types of particles 32 and 34 are distributed in each of the sub-pixels S.

A plurality of first electrodes and a plurality of second electrodes, which cross each other with sub-pixel cavities interposed therebetween, are respectively formed on the upper substrate 10 and the lower substrate 20. In this case, the first electrodes are defined as scan electrodes 12A for performing scanning, and the second electrodes are defined as data electrodes 22 for inputting digital video signals.

The particles 32 and 34 that are provided in the corresponding sub-pixel cavities, that is, electrically charged particles, move in response to variation in the polarity of voltage applied across the scan electrodes 12A and the data electrodes 22, so that variation in the amount of reflection of incident light occurs, therefore color is implemented.

Particularly, in the present invention, each of the scan electrodes 12A is divided into two or more line electrode patterns corresponding to the single sub-pixel S. Accordingly, in the present embodiment, each of the scan electrodes 12A divided into three line electrode patterns is described as an example.

That is, referring to FIG. 5, a single pixel P is approximately formed in a square structure when viewed from above. Each of the three R, G and B sub-pixels S is formed in a rectangular structure when viewed from above.

In this case, each of the data electrodes 22 extends across the length of the rectangular structure, and each of the scan electrodes 12A crossing the data electrodes 22 extends across the width of the rectangular structure.

Accordingly, in the present invention, each of the scan electrodes 12A, having a relatively large width, is divided into a plurality of line electrode patterns to mitigate the non-uniformity of the electric field distribution between the data electrodes 22 and the scan electrodes 12A. In this case, it is most preferred that each of the data electrodes 22 be formed to have the same width as each of the electrodes 12b obtained through the division of each of the scan electrodes 12A.

That is, like the enlarged view of FIG. 5, one data electrode 22 and the three line electrode patterns 12b, which are obtained through the division of each of the scan electrodes 12A, are formed in a single sub-pixel S. In this case, the data electrode 22 and the electrode pattern 12b which are obtained though the division, are formed to have the same width.

Accordingly, each of the scan electrodes 12A is composed of three line electrode patterns 12b diverging from a single connection portion 12a.

Figure 6:
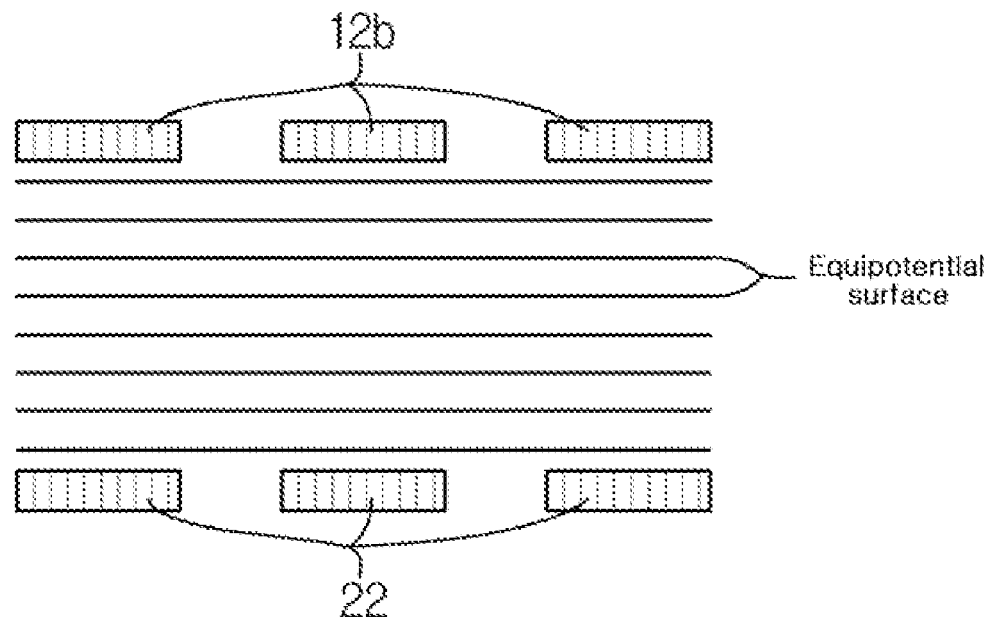
FIG. 6 is a view illustrating an electric field distribution generated using the electrode arrangement structure according to the embodiment of the present invention.

FIG. 6 is a view showing an equipotential surface obtained when the electrodes 12b, which are obtained through the division of each of the scan electrodes 12A, and the data electrodes 22 are formed to have the same width and voltage is applied therebetween. When the two electrode 12b and 22 are formed to have the same width as described above, the overall electric field distribution between the two types of electrodes 12b and 22 is uniform.

Figure 1:
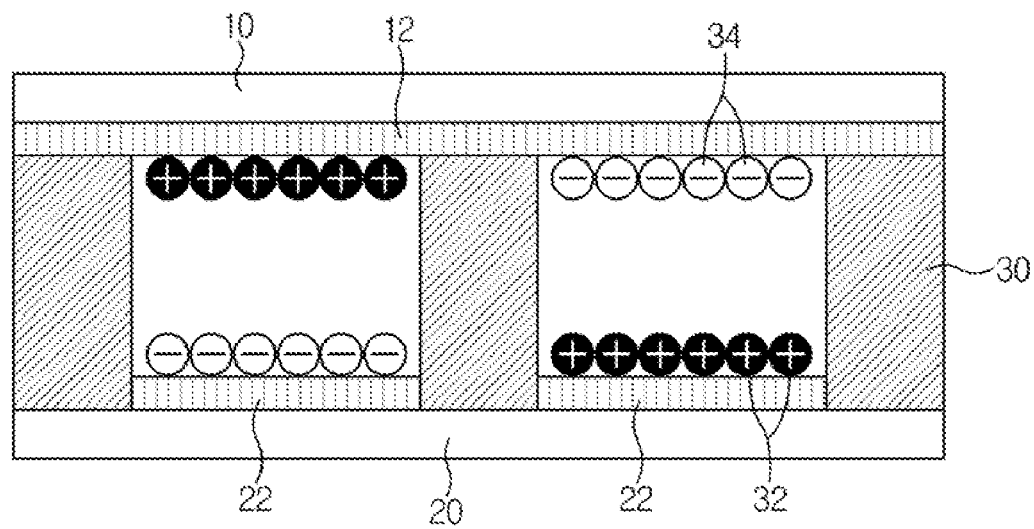
FIG. 1 is a sectional view showing the structure of a conventional reflective display device.
Figure 2:
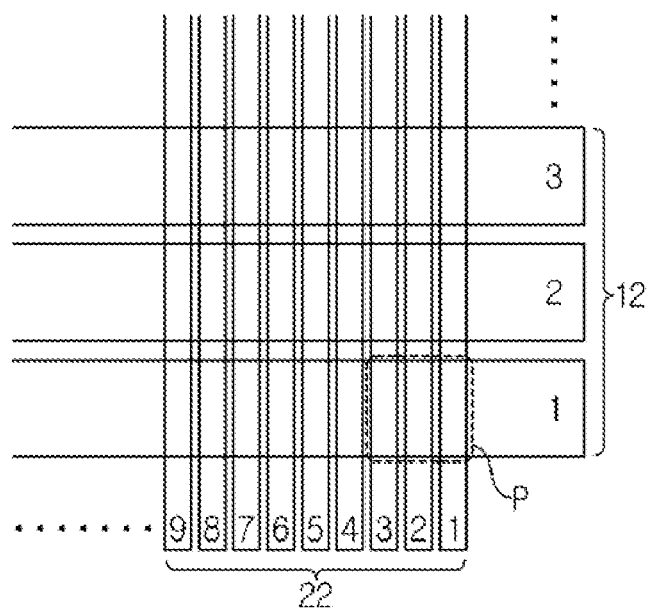
FIG. 2 is a plan view showing the electrode arrangement structure of the conventional reflective display device.
Figure 3:
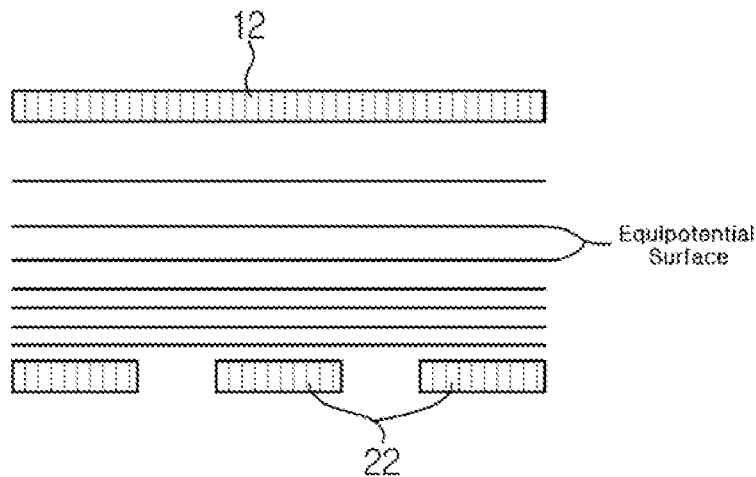
FIG. 3 is a view illustrating an electric field distribution generated by the conventional electrode arrangement structure.

That is, conventionally, problems occur in that, as shown in FIG. 3, the electric field distribution is asymmetrical because the width of each of the scan electrodes 12 is greater than the width of each of the data electrodes 22, so that, when reciprocal powers are applied such that inverse polarity is exhibited at the time of driving the display device, the respective voltages for representing black and white colors differ from each other due to the above-described asymmetry.

However, in the present invention, as shown in FIG. 6, the scan electrodes 12A, each of which is divided into three line electrode patterns obtained through the division, and the data electrodes 22 are formed to have the same width, so that the electric field distribution is uniform around a positive electrode and electric field lines are distributed at equal intervals, therefore the apparent voltages of black and white colors are the same.

Accordingly, the symmetry of drive voltages is realized, so that a drive waveform for causing black particles to appear can be applied in the same manner as a drive waveform for causing white particles to appear, and the overall design of the drive waveforms is facilitated.

Furthermore, the same type of drive ICs can be used regardless of the colors of the particles, so that the manufacturing yield of the display device can be improved.

Although, in the above-described embodiment of the present invention, a structure in which each of the scan electrodes 12A is divided into three line electrode patterns has been described, the present invention is not limited thereto and may employ a structure in which each of the scan electrode 12A is divided into two line electrode patterns or four or more line electrode patterns. However, it is preferred that the line electrode patterns 12*b*, which are obtained through the division of each of the scan electrodes 12A, and the data electrodes 22 be formed such that the difference in the widths thereof is not too great.

Figure 7:
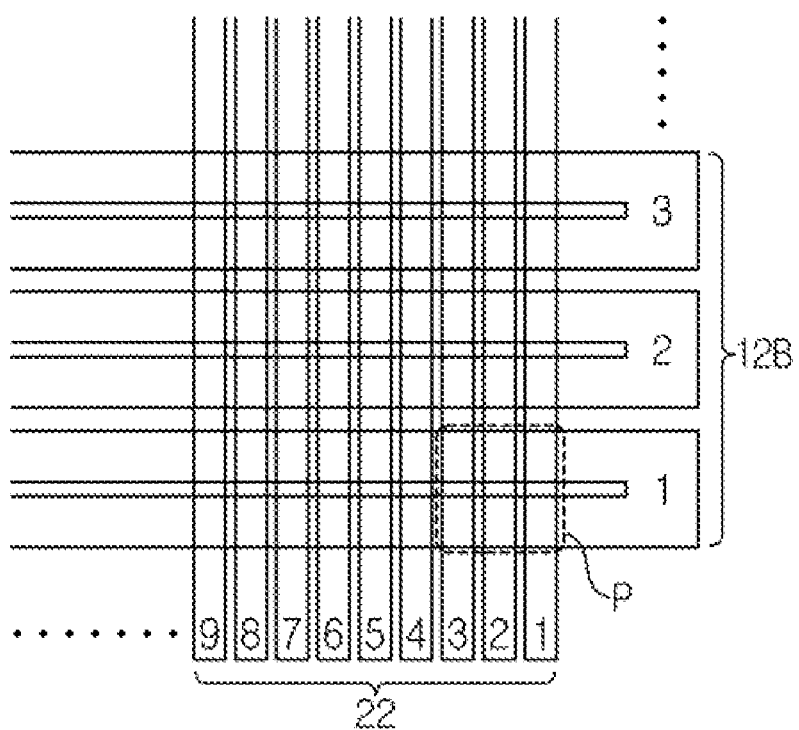
FIGS. 7 and 8 are plan views showing the respective electrode arrangement structures of reflective display devices according to other embodiments of the present invention.
Figure 8:
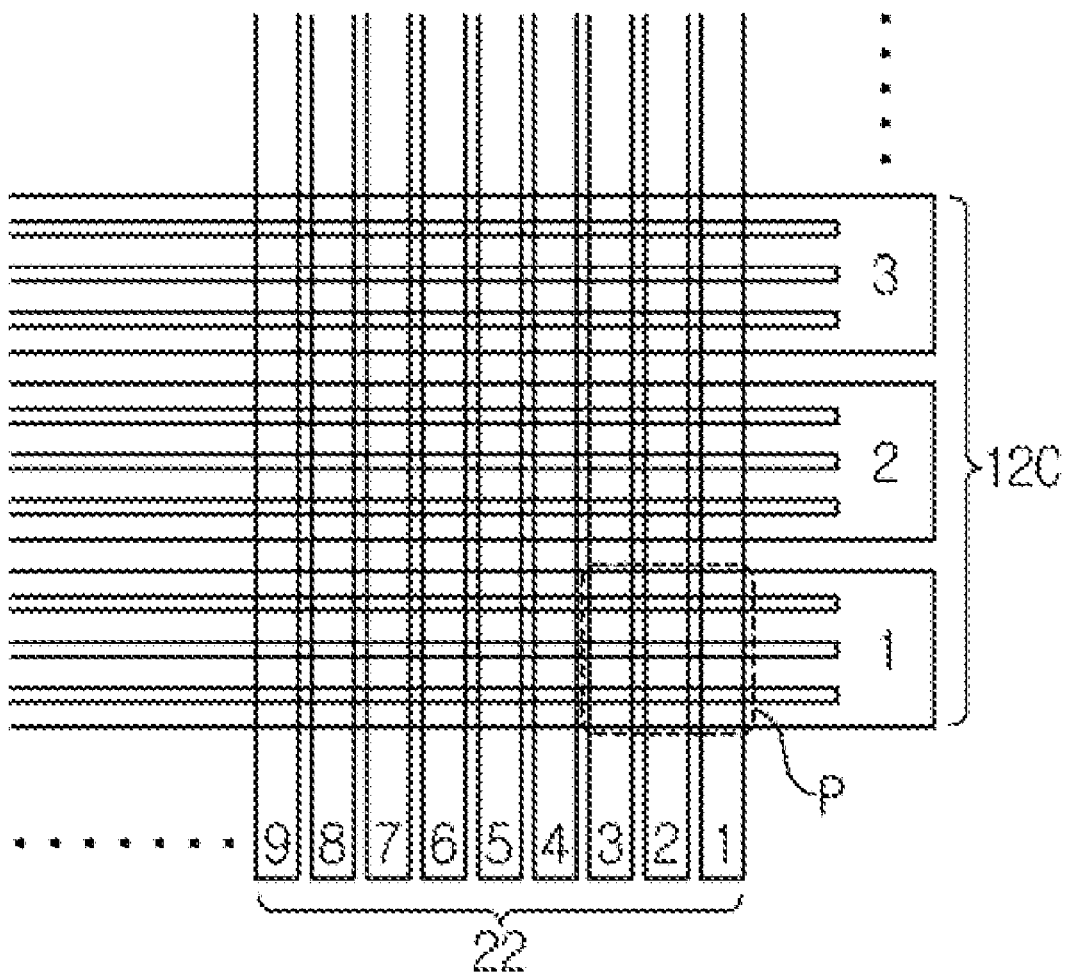

The constructions of embodiments other than that described above are described with reference to FIGS. 7 and 8 below. FIG. 7 shows an example in which each of scan electrodes 12B is divided into two line electrode patterns, and FIG. 8 shows an example in which each of scan electrodes 12C is divided into four line electrode patterns.

Although the width of the data electrodes 22 is the most important parameter, the number of line electrode patterns which are obtained through the division of each of the above-described scan electrodes 12A, 12B or 12C, and the width of the line electrode patterns may be set in various ways in consideration of the structure of the sub-pixels S, the design of respective drive voltages, the arrangement structure of the electrodes, and environmental conditions.

In accordance with the reflective display device of the present invention, constructed and operating as described above, each of the scan electrodes is divided into two or more line electrode patterns and the line electrode patterns have the same width as the data electrodes, so that the symmetry of the drive voltages can be realized, therefore the design of a drive waveform can be facilitated, and identical types of drive ICs can be used together regardless of colors thereof, therefore the mass production of display devices can be facilitated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reflective display device, comprising:
    a first substrate and a second substrate located parallel to each other and forming a plurality of sub-pixel cavities;
    a first electrode group and a second electrode group respectively formed on the first and second substrates, arranged to cross each other with the sub-pixel cavities interposed therebetween, wherein each electrode of one of the first and second electrode groups is divided into two or more line electrode patterns and the line electrode patterns extend through the corresponding sub-pixel cavities; and
    electrically charged toner particles located in the corresponding sub-pixel cavities, and moving in response to variation in polarity of voltage applied across the first and second electrodes.

2. The reflective display device as set forth in claim 1, wherein the line electrode patterns, which are obtained through the division of each electrode of the one electrode group, are formed to have a width substantially identical to that of each electrode of a remaining electrode group.

3. The reflective display device as set forth in claim 2, wherein each electrode of the one electrode group, which is divided into the two or more line electrode patterns, is divided into three line electrode patterns.

4. The reflective display device as set forth in claim 1, wherein, when the electrodes of the first electrode group are data electrodes and the electrodes of the second electrode group are scan electrodes, each of the scan electrodes is divided into two or more line electrode patterns so that a width of the line electrode patterns is identical to that of the data electrodes.

5. The reflective display device as set forth in claim 2, wherein, when the electrodes of the first electrode group are data electrodes and the electrode of the second electrode group are scan electrodes, each of the scan electrodes is divided into two or more line electrode patterns so that a width of the line electrode patterns is identical to that of the data electrodes.

6. A reflective display device, comprising:
    a first substrate and a second substrate located parallel to each other and forming a plurality of sub-pixel cavities;
    a plurality of data electrodes formed on the first substrate and extending through the corresponding sub-pixel cavities;
    a plurality of scan electrodes disposed on the second substrate to cross the data electrodes with the sub-pixel cavities interposed between the data electrode and the scan electrodes, each of the scan electrodes being formed to have two or more line electrode patterns, which are obtained through division, wherein the line electrode patterns extend through the corresponding sub-pixel cavities; and
    electrically charged toner particles located in the corresponding sub-pixel cavities, and moving in response to variation in polarity of voltage applied across the first and second electrodes.

7. The reflective display device as set forth in claim 6, wherein each of the scan electrodes is divided into two or more line electrode patterns so that the line electrode patterns diverge from a single electrode connection portion and extend through the corresponding sub-pixel cavities.

8. The reflective display device as set forth in claim 6, wherein the line electrode patterns, which are obtained through division of each of the scan electrodes, are formed to have a width substantially identical to that of the data electrodes.

9. The reflective display device as set forth in claim 6, wherein each of the scan electrodes is divided into the line electrode patterns.

10. The reflective display device as set forth in claim 7, wherein each of the scan electrodes is divided into the line electrode patterns.

11. The reflective display device as set forth in claim 8, wherein each of the scan electrodes is divided into three line electrode patterns.

* * * * *